United States Patent [19]
Chien

[11] Patent Number: 5,717,503
[45] Date of Patent: Feb. 10, 1998

[54] ACTUATING MECHANISM FOR OPTICAL SCANNER

[75] Inventor: Ming Chien, Taipei, Taiwan

[73] Assignee: First International Computers, Inc., Taipei, Taiwan

[21] Appl. No.: 621,688

[22] Filed: Mar. 26, 1996

[51] Int. Cl.⁶ .................................................. H04N 1/04
[52] U.S. Cl. ........................ 358/475; 358/474; 358/497; 355/84
[58] Field of Search ................................. 358/475, 474, 358/482, 484, 497, 494, 486, 480; 348/195, 200, 201; 355/84; 399/209; H04N 1/04

[56] References Cited

U.S. PATENT DOCUMENTS

| | | | |
|---|---|---|---|
| 5,018,025 | 5/1991 | Herloski | 358/474 |
| 5,194,898 | 3/1993 | Costrop et al. | 358/474 |
| 5,289,000 | 2/1994 | Toyofuku | 358/497 |
| 5,311,015 | 5/1994 | Takeuchi | 358/497 |

*Primary Examiner*—Edward L. Coles, Sr.
*Assistant Examiner*—Madeleine Au Nguyen
*Attorney, Agent, or Firm*—W. Wayne Liauh

[57] ABSTRACT

An actuating apparatus for optical scanners which can cause the lamp and the reflecting mirror to travel at a desired ratio of distances such that the total distance of scanner's light path before and after the lamp movement remains substantially unchanged. The actuating apparatus employs only one belt, thus greatly simplifying the structure of the scanner, improving the reliability thereof, and allowing the scanner to become more compact.

4 Claims, 3 Drawing Sheets

5,717,503

ACTUATING MECHANISM FOR OPTICAL SCANNER

BACKGROUND OF THE INVENTION

1. Field of the Invention

This invention relates to an actuating apparatus for use in optical scanners, and particularly to a mechanism which can cause the lamp and the reflecting mirror of a scanner to be moved at a desired ratio such that the traveling distance of the scanner's light path will remain unchanged, thus providing a better quality of the scanning image. The actuating apparatus of the present invention can also cause the scanner to become more compact in size.

2. Description of the Prior Art

Optical scanners are widely used nowadays in automated office environment. An optical scanner is an effective tool for document processing and data input, and it can greatly improve productivity. Conventional optical scanners mainly comprise a light source, a transparent glass plate, a camera device, an actuating mechanism, a variety of electronic circuits, a power supply unit and a frame. The layout and structure of these components can be different, but the traveling distance of the scanner's light path should generally be maintained at a fixed length to prevent distortion of the scanned image.

In order to meet the requirement set forth above, conventional scanners generally utilize various types of actuating mechanisms. Some employ a cam and linkage combination, others employ two belts. Still there are other scanners that utilize a roller and steel rope construction. FIG. 1 illustrates the roller and steel rope embodiment commonly used in a conventional scanner. As shown in FIG. 1, steel rope (1) has to be wound a number of times around the actuating roller (2) to generate enough friction force to drive the actuating roller (2). It thus requires certain width (w) on the roller (2) to accommodate the steel rope (1) to move a steel rope moving displacement (x), which takes place during the scanner operation. The roller and steel rope structure generally increases the production and assembly complexity. Another commonly used actuating mechanism is the two-belt structure. One belt is used to drive the lamp set while the other belt is used to drive the reflecting mirror. This construction involves a higher cost. And its accuracy and reliability are relatively poor because of the use of the two belts that are involved.

SUMMARY OF THE INVENTION

In view of the aforementioned disadvantages of the conventional actuating mechanisms, it is therefore an object of this invention to provide an improved actuating mechanism for optical scanners that can cause the lamp and the reflecting mirror be moved at a desired ratio so that the traveling distance of the scanner's light path will remain substantially unchanged. This invention further contemplates to use only one belt in the actuating mechanism, so that the whole scanner can be made to be more compact.

DESCRIPTION OF THE PREFERRED EMBODIMENT

Figure 1:
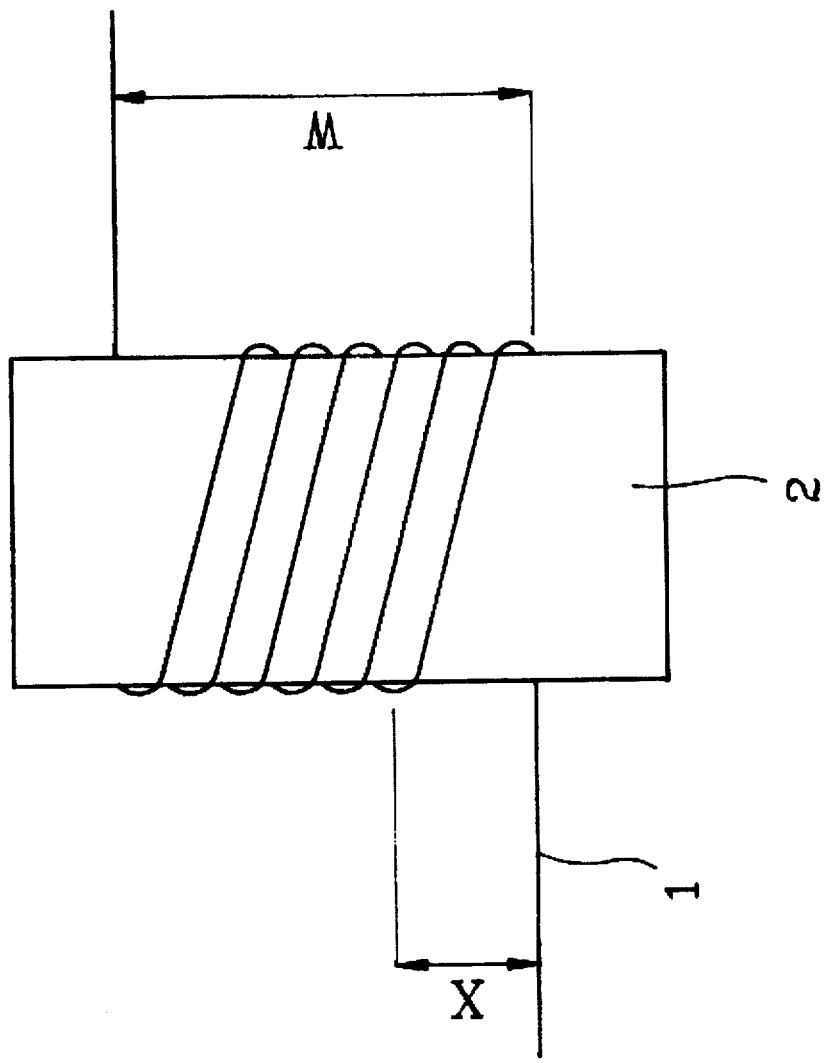
FIG. 1 illustrates a fragmentary side view of an actuating mechanism of a conventional scanner.
Figure 2:
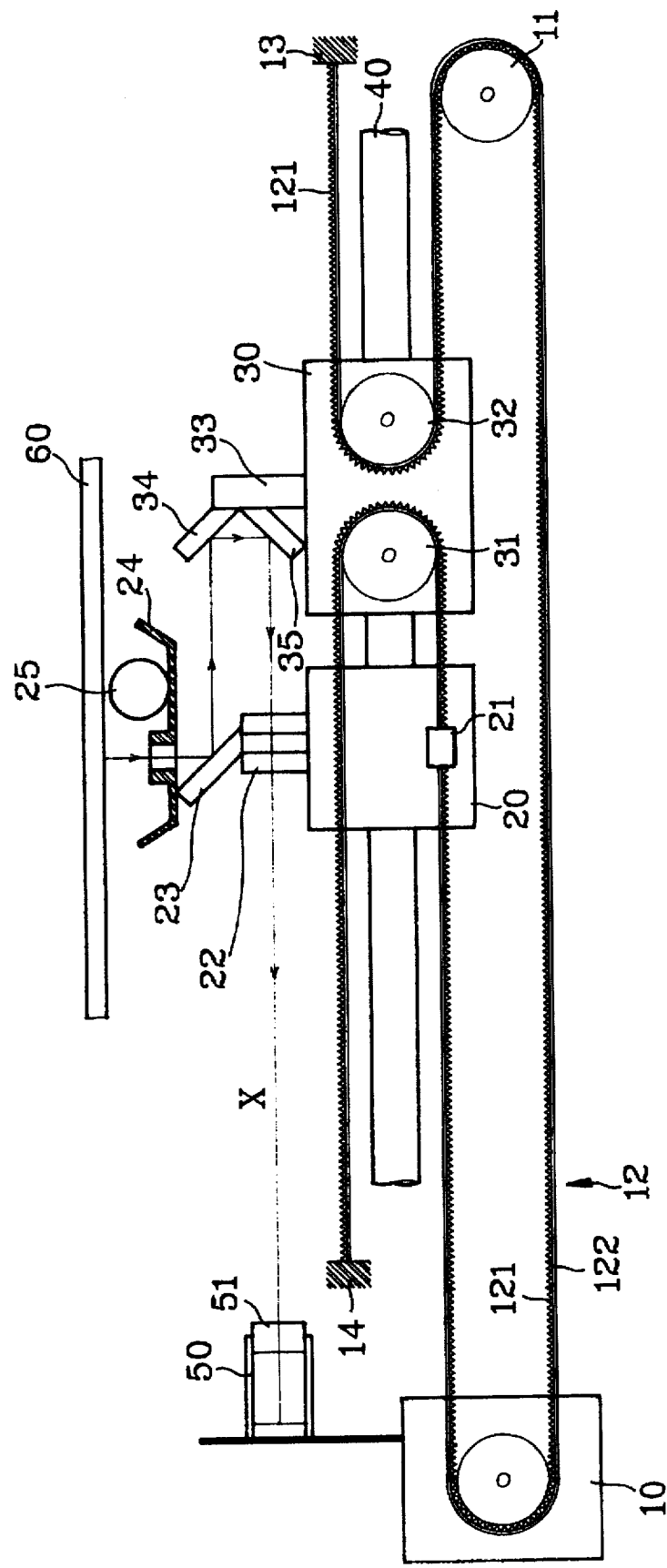
FIG. 2 is a fragmentary side view of this invention in a use state.

Referring now to FIG. 2 for an embodiment of this invention, the actuating mechanism includes mainly a driving motor and wheel (10), an idler (11), a belt (12), a lamp sliding block (20), a reflecting mirror sliding block (30) and a shaft (40). Belt (12) has a cog surface (121) on one side thereof and a flat surface (122) on the opposite side. FIG. 2 shows that the reflecting mirror sliding block (30) is closer to the idler (11); whereas the lamp sliding block (20) is closer to the driving motor and wheel (10).

The two ends of the belt (12) attach respectively to the two fixed ends (13) and (14). Both the lamp sliding block (20) and the reflecting mirror sliding block (30) run through shaft (40) and can be sliding thereabout. There is a clamp (21) on the lamp sliding block (20) for fixedly engaging with the belt (12). There are two pulleys (31) and (32) disposed on the reflecting mirror sliding block (30) and being movably engaged with the belt (12). Belt (12) winds around various components as shown in FIG. 2.

On top of the lamp sliding block (20), there is provided a substantially vertical lamp seat (22). On the lamp seat (22) there is provided a first reflecting mirror (23). The surface of the first reflecting mirror (23) and the horizontal line form an angle of 135 degrees. Above the first reflecting mirror (23), there is a lamp frame (24), which has a lamp (25) disposed therein. Lamp frame (24) is firmly engaged with the reflecting mirror (23) and thus is movable along with the lamp sliding block (20).

On the reflecting mirror sliding block (30), there is provided a mirror seat (33). On the mirror seat (33), there are a second reflecting mirror (34) and a third reflecting mirror (35). The second reflecting mirror (34) forms a 135-degree angle with the horizontal line, while the third reflecting mirror (35) forms a 135-degree angle with the horizontal line.

When in use, the scanning document is placed on the transparent glass plate (60). Light beam originated from lamp (24) passes through the transparent glass plate (60), hitting the document, then reflects the image signal and transmits to reflecting mirrors (23), (34), (35) and lamp seat (22), and finally reaches camera lens (51) of the CCD (charge-coupled device) camera (50) to complete the light path of scanning process.

Figure 3:
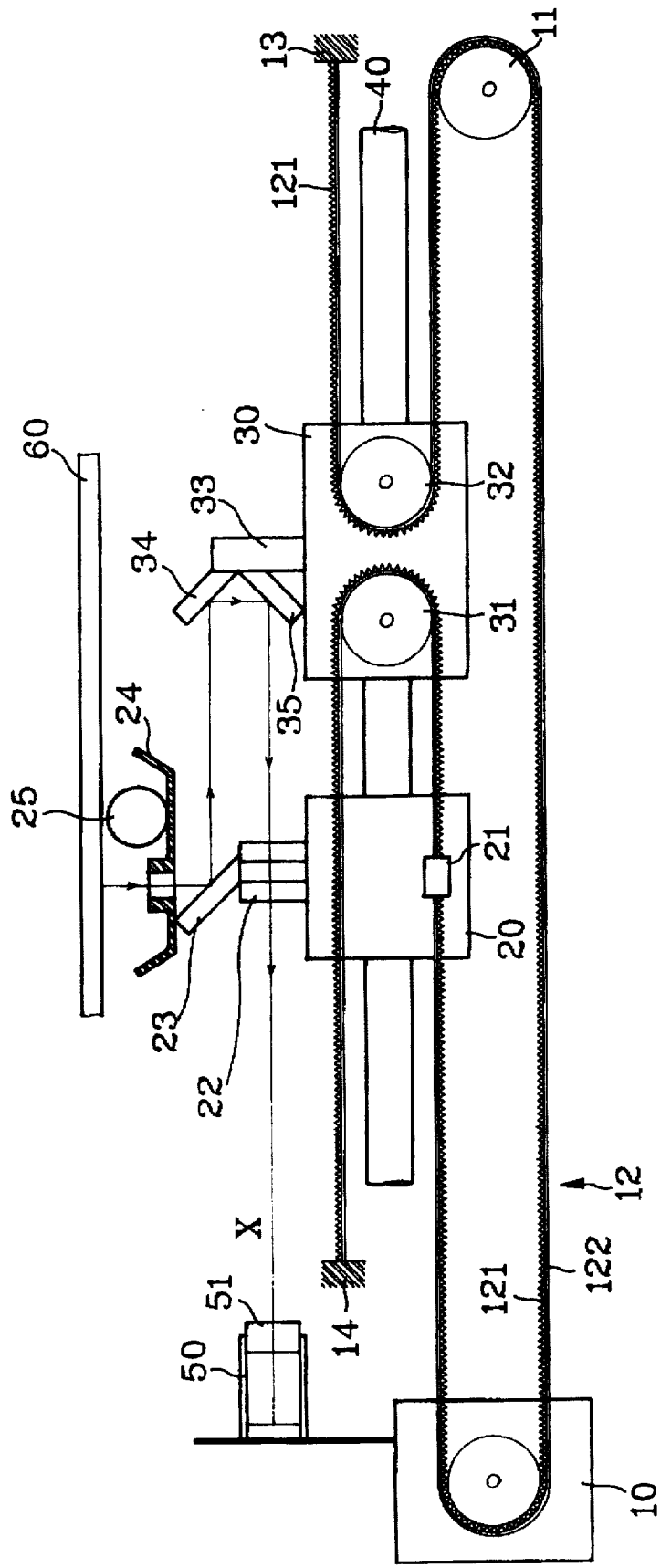
FIG. 3 is a fragmentary side view of this invention in another use state.

FIG. 3 illustrates this invention in another use state. When the motor and wheel (10) both rotate in a counter clockwise direction (as show in FIG. 2), belt (12) moves the lamp sliding block (20) and the reflecting mirror sliding block (30) concurrently along the shaft (40) in the same direction toward the fixed end (14) and the CCD camera (50). As lamp sliding block (20) is clamped with the belt (12), it travels the same distance as the belt. However, the reflecting mirror sliding block (30) is moved by winding around the belt (12) through pulleys (31) and (32) with two-pass (up and down), the traveling distance of the reflecting mirror sliding block (30) is one half of that of the lamp sliding block (20). The distance between the lamp sliding block (20) and the reflecting mirror sliding block (30) will gradually increase as the lamp sliding block (20) continuously moves toward the CCD camera (50). The reduced distance between the lamp sliding block and the CCD camera caused by the movement of the lamp sliding block (20) thus will be compensated for by the increased distance between the lamp sliding block (20) and the reflecting mirror sliding block (30). Therefore, the total and final light path distance of the scanner will substantially remain the same before and after the movement of the lamp sliding block. Thus there will be no image distortion occurring on the image being scanned when it is transmitted into the CCD camera (50).

The present invention uses only one belt (12) to achieve the required function. It is much simpler than the roller and steel rope wiring mechanism. It is also more reliable and more compact than the two-belt structure of a conventional scanner. Belt (12) of this invention may have a cog surface (121) on one side thereof to engage positively with the motor and wheel (10). Another side (122) of belt (12) may be of a flat surface to wind around pulleys (31) and (32) for reducing friction, thus facilitating the movement of the reflecting mirror sliding block (30). The positions of the fixed ends (13) and (14) may be changed to adjust the tension of the belt (12).

It may thus be seen that the objects of this invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An actuating apparatus for optical scanners, comprising:

a lamp sliding block movable along a shaft, said lamp sliding block including a clamp for firmly engaging with a belt, and a lamp seat, said lamp seat being disposed on a top of said lamp sliding block and having a lamp frame disposed on a top of said lamp seat, and said lamp frame having a lamp disposed inside said lamp frame;

a reflecting mirror sliding block movable along said shaft, said reflecting mirror sliding block including a mirror seat located on a top of said reflecting mirror sliding block, and two pulleys for respectively engaging with said belt;

an idler engaged with said belt, said idler being located closer to said reflecting mirror sliding block than to said lamp sliding block;

a motor and wheel means engaged with said belt, said motor and wheel means being located closer to said lamp sliding block than to said reflecting mirror sliding block;

two fixed ends each being fixedly engaged with said belt and said fixed ends being located near two ends of said shaft, respectively; and a CCD camera located near one of said two fixed ends where said motor and wheel means is located;

wherein said belt engages sequentially with one of said fixed ends, one of said pulleys, said clamp, said motor and wheel means, said idler, another of said pulleys, and another of said fixed ends.

2. The actuating apparatus for optical scanners according to claim 1 which is constructed such that when said motor and wheel means rotates, said belt is moved which consequently moves said lamp sliding block and said reflecting mirror sliding block toward said CCD camera, so that the moving distance of said lamp sliding block is twice the moving distance of said reflecting mirror sliding block.

3. The actuating apparatus for optical scanners according to claim 1, wherein said belt has first and second belt faces, said first belt face of said belt has a cog surface for engaging with said motor and wheel means, as well as with said idler, and said second belt face of said belt has a flat surface for engaging with said two pulleys.

4. The actuating apparatus for optical scanners according to claim 1, wherein the positions of said two fixed ends are changeable for adjusting the tension of the belt.

* * * * *